United States Patent
Acar et al.

(10) Patent No.: US 9,514,305 B2
(45) Date of Patent: Dec. 6, 2016

(54) CODE POINTER AUTHENTICATION FOR HARDWARE FLOW CONTROL

(71) Applicant: QUALCOMM Incorporated, San Diego, CA (US)

(72) Inventors: Can Acar, San Diego, CA (US); Arvind Krishnaswamy, San Jose, CA (US); Robert Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 14/517,572

(22) Filed: Oct. 17, 2014

(65) Prior Publication Data

US 2016/0110545 A1    Apr. 21, 2016

(51) Int. Cl.
*G06F 21/56* (2013.01)
*G06F 21/55* (2013.01)
*G06F 21/52* (2013.01)

(52) U.S. Cl.
CPC ............... *G06F 21/56* (2013.01); *G06F 21/52* (2013.01); *G06F 21/554* (2013.01)

(58) Field of Classification Search
CPC .. G06F 2221/033; G06F 21/566; G06F 21/52; G06F 21/125; G06F 12/1408; G06F 9/4426; H04L 63/14
See application file for complete search history.

(56) References Cited

U.S. PATENT DOCUMENTS

| | | |
|---|---|---|
| 2003/0182572 A1 | 9/2003 | Cowan et al. |
| 2008/0133858 A1 | 6/2008 | Enbody et al. |
| 2009/0282393 A1 | 11/2009 | Costa et al. |
| 2014/0020092 A1 | 1/2014 | Davidov |
| 2014/0096245 A1 | 4/2014 | Fischer |
| 2014/0101461 A1 | 4/2014 | Chhabra et al. |

OTHER PUBLICATIONS

Mashtizadeh A.J., et al., "Cryptographically Enforced Control Flow Integrity", arXiv:1408.1451V1 [cs.CR], Aug. 7, 2014, pp. 1-15.
Philippaerts P., et al., "Code Pointer Masking: Hardening Applications against Code Injection Attacks," Detection of Intrusions and Malware, and Vulnerability Assessment, Lecture Notes in Computer Science, 2011, vol. 6739, pp. 194-213.
International Search Report and Written Opinion—PCT/US2015/051955—ISA/EPO—Dec. 7, 13 pgs.
Pyo C., et al., "Run-time Detection of Buffer Overflow Attacks without Explicit Sensor Data Objects," Information Technology: Coding and Computing. 2004. Proceedings. ITCC 2004. International Conference on Las Vegas. NV. USA Apr. 5-7, 2004. Piscataway. NJ. USA. IEEE. vol. 1. Apr. 5, 2004 (Apr. 5, 2004). pp. 50-54. XP010696617. DOI: 10.1109/OTCC.2004.1286425 ISBN: 978-0-7695-2108-4.
Second Written Opinion from International Application No. PCT/US2015/051955, dated Sep. 19, 2016, 5 pp.

*Primary Examiner* — Amir Mehrmanesh
(74) *Attorney, Agent, or Firm* — Hunter Clark PLLC

(57) ABSTRACT

Techniques for enforcing flow control of a software program in a processor are provided. An example method according to these techniques includes analyzing program code of the software program to identify a code pointer in the program code, generating an authentication tag based on the code pointer, and modifying the code pointer in the program code with the authentication tag to generate a tagged code pointer.

30 Claims, 6 Drawing Sheets

Computer System

Executing Code with Protected Code Pointer
(continue FIG. 2)

Protecting Code Pointer

Modify Code Pointer with Authentication Tag (stage 215)

Generate Authentication Tag (stage 210)

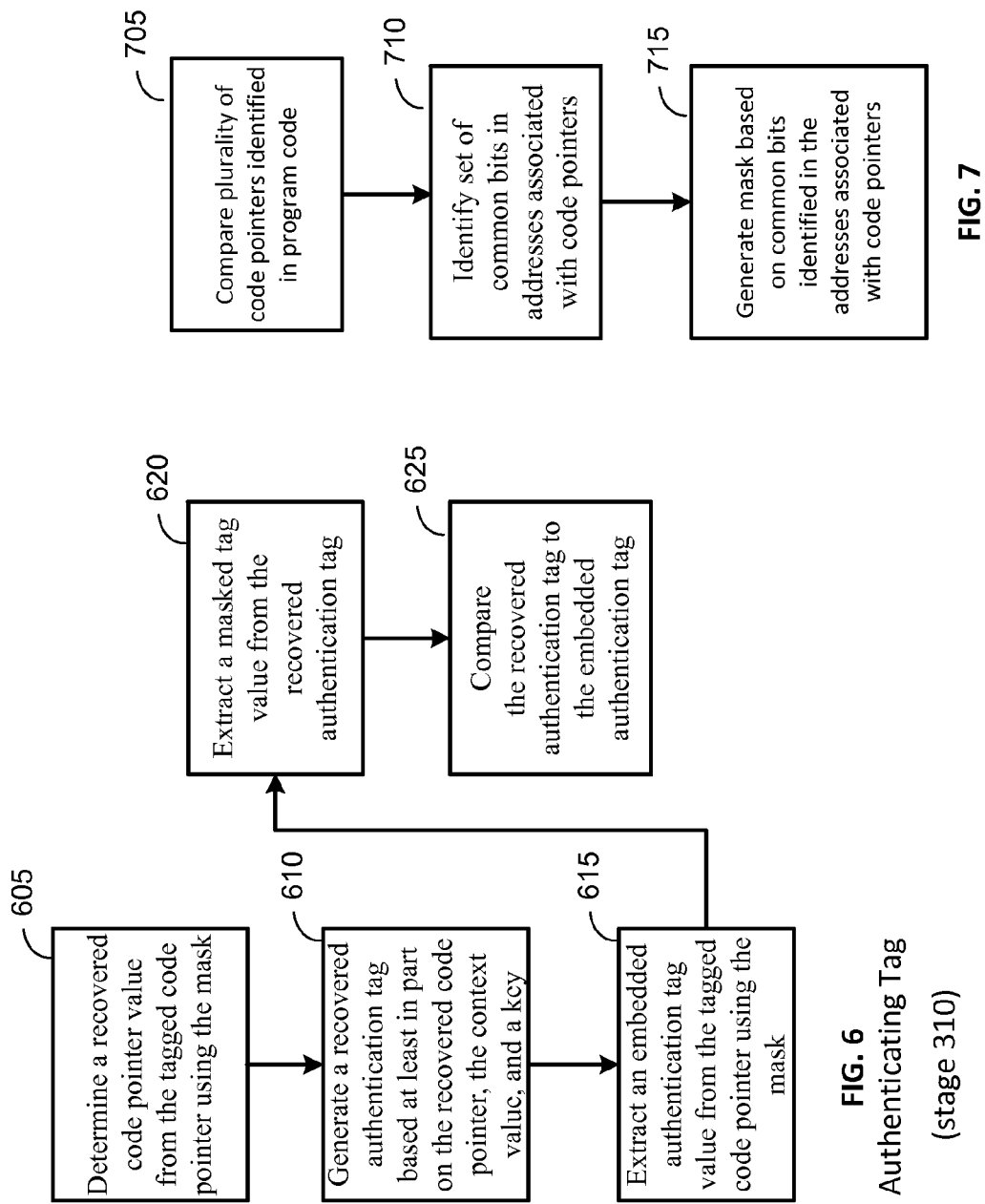

CODE POINTER AUTHENTICATION FOR HARDWARE FLOW CONTROL

BACKGROUND

Software implementation errors, such as missing or incorrect input validation, can lead to out-of-bounds buffer accesses and memory corruption. These implementation errors can lead to the software becoming unstable or eventually crashing under normal conditions. However, when an input is manipulated by a malicious party intent on attacking the computer system, these memory corruption and overflow bugs can be exploited by the attacker to change the expected behavior of the software code and to execute code or functionality determined by the attacker.

An attacker typically gains control of execution by overwriting a data structure in memory, such as a return address, a function pointer, or a virtual-table pointer. Finding and fixing all exploitable memory-corruption bugs in large and legacy code-bases is not always possible. Accordingly, many computer systems contain general defensive features, called "exploit mitigation mechanisms," that are effective against well-known techniques attackers use to exploit these bugs to gain control of and/or damage targeted computer systems.

Some examples of exploit mitigation mechanisms that are commonly included in computer systems include: Data Execution Prevention (DEP), Stack Protection (SP), and Address Space Layout Randomization (ASLR). In the DEP technique, all code sections are marked as read-only and all writable regions are non-executable. Typically, the read-only property of the code sections and the non-executable property of the writeable sections is enforced by the memory management unit (MMU) of the processor. This technique can prevent an attacker from placing their own code into a data area and directing execution flow to that code. In the SP approach, the compiler implements functions to detect buffer overflows on the stack. Stack-based buffer overflows can be easy to exploit, since there is often a return address or saved link-register on the stack right after a local array. An attacker can cause the local array to overflow and to overwrite the return address/link register and redirect execution flow of the software. Many conventional stack protection implementations insert a guard value onto the stack in the function prologue and check for modifications of that value before returning from that function. If a buffer overflow has occurred, the guard value will have been overwritten along with the return address, because the guard value is located in the stack between the buffer and the return address. The guard value must be a random and/or unpredictable value in order for the SP approach to be secure. In the ASLR approach, the memory layout of an application can be randomized at each execution. For example, the base address for code, static data, stack, and heap can be determined randomly. This approach makes exploitation difficult since attackers need to predict the location of the code/data/pointers they need to target/manipulate for a successful attack.

SUMMARY

An example method for enforcing flow control of a software program in a processor according to the disclosure includes analyzing program code of the software program to identify a code pointer in the program code, generating an authentication tag based on the code pointer, and modifying the code pointer in the program code with the authentication tag to generate a tagged code pointer.

Implementations of such a method may include one or more of the following features. Modifying the code pointer in the program code with the authentication tag to generate the tagged code pointer further includes generating the tagged code pointer by applying a mask to the authentication tag and the code pointer. Generating the tagged code pointer by applying the mask to the authentication tag and the code pointer further includes selecting a first set of bits from the authentication tag using the mask, and replacing a second set of bits of the code pointer corresponding to the first set of bits with the first set of bits to generate the tagged code pointer. Identifying a plurality of code pointers in the program code, and identifying tag bits common to the plurality of code pointers in the program code to determine the mask. Authenticating the tagged code pointer, performing error handling responsive to the authentication tag having been altered, and executing a program instruction at an address associated with the code pointer responsive to the authentication tag having not been altered. Authenticating the tagged code pointer includes determining a recovered code pointer value from the tagged code pointer using the mask. Extracting an embedded authentication tag value from the tagged code pointer using the mask. Generating a recovered authentication tag based at least in part on the recovered code pointer and the context value. Extracting a masked tag value from the recovered authentication tag using the mask. Comparing the masked tag value to the embedded authentication tag value to determine whether the tagged code pointer has been altered.

An example apparatus for enforcing flow control of a software program in a processor according to the disclosure includes means for analyzing program code of the software program to identify a code pointer in the program code, means for generating an authentication tag based on the code pointer; and means for modifying the code pointer in the program code with the authentication tag to generate a tagged code pointer.

Implementations of such an apparatus may include one or more of the following features. The means for modifying the code pointer in the program code with the authentication tag to generate the tagged code pointer includes means for generating the tagged code pointer by applying a mask to the authentication tag and the code pointer. The means for generating the tagged code pointer by applying the mask to the authentication tag and the code pointer further includes means for selecting a first set of bits from the authentication tag using the mask and means for replacing a second set of bits of the code pointer corresponding to the first set of bits with the first set of bits to generate the tagged code pointer. Means for identifying a plurality of code pointers in the program code, and means for identifying tag bits common to the plurality of code pointers in the program code to determine the mask. Means for authenticating the tagged code pointer, means for performing error handling responsive to the authentication tag having been altered, and means for executing a program instruction at an address associated with the code pointer responsive to the authentication tag having not been altered. Means for determining a recovered code pointer value from the tagged code pointer using the mask.

An example apparatus for enforcing flow control of a software program in a processor according to the disclosure includes a processor configured to analyze program code of the software program to identify a code pointer in the program code, generate an authentication tag based on the code pointer, and modify the code pointer in the program code with the authentication tag to generate a tagged code pointer.

Implementations of such an apparatus may include one or more of the following features. The processor being configured to modify the code pointer in the program code with the authentication tag to generate the tagged code pointer is further configured to generate the tagged code pointer by applying a mask to the authentication tag and the code pointer. The processor being configured to generate the tagged code pointer by applying the mask to the authentication tag and the code pointer is further configured to select a first set of bits from the authentication tag using the mask, and replace a second set of bits of the code pointer corresponding to the first set of bits with the first set of bits to generate the tagged code pointer. The processor is further configured to identify a plurality of code pointers in the program code, and identify tag bits common to the plurality of code pointers in the program code to determine the mask. The processor is further configured to authenticate the tagged code pointer, perform error handling responsive to the authentication tag having been altered, and execute a program instruction at an address associated with the code pointer responsive to the authentication tag having not been altered. The processor being configured to authenticate the tagged code pointer is further configured to determine a recovered code pointer value from the tagged code pointer using the mask. The processor is further configured to extract an embedded authentication tag value from the tagged code pointer using the mask.

A non-transitory computer-readable medium, having stored thereon computer-readable instructions for enforcing flow control of a software program in a processor, according to the disclosure includes instructions configured to cause a computer to analyze program code of the software program to identify a code pointer in the program code, generate an authentication tag based on the code pointer, and modify the code pointer in the program code with the authentication tag to generate a tagged code pointer.

The instructions configured to cause the computer to modify the code pointer in the program code with the authentication tag to generate the tagged code pointer is further comprise instructions configured to cause the computer to generate the tagged code pointer by applying a mask to the authentication tag and the code pointer. The instructions configured to cause the computer to generate the tagged code pointer by applying the mask to the authentication tag and the code pointer further comprise instructions configured to cause the computer to select a first set of bits from the authentication tag using the mask, and replace a second set of bits of the code pointer corresponding to the first set of bits with the first set of bits to generate the tagged code pointer. Instructions configured to cause the computer to identify a plurality of code pointers in the program code, and identify tag bits common to the plurality of code pointers in the program code to determine the mask. Instructions configured to cause the computer authenticate the tagged code pointer, perform error handling responsive to the authentication tag having been altered, and execute a program instruction at an address associated with the code pointer responsive to the authentication tag having not been altered. The instructions configured to cause the computer to authenticate the tagged code pointer further comprise instructions configured to cause the computer to determine a recovered code pointer value from the tagged code pointer using the mask. Instructions configured to cause the computer to extract an embedded authentication tag value from the tagged code pointer using the mask.

BRIEF DESCRIPTION OF THE DRAWINGS

FIG. 6 is a flow diagram of an example process for authenticating a code pointer that has been protected according to the code pointer authentication process illustrated in FIG. 3.

FIG. 7 is a flow diagram of an example process for generating a mask.

DETAILED DESCRIPTION

Techniques are provided for implemented code pointer authentication in hardware to prevent malicious or poorly written code from modifying code pointers in software code to be executed by a processor of a computer system. The techniques disclosed herein can be used to tag code pointers in software code. The tags can be used to authenticate a code pointer as a valid pointer to executable code before the processor executes a jump or branch instruction to an address associated with the code pointer. If authentication of a tagged code pointer fails, the processor can be configured to perform an error handling procedure that can be used to halt the execution the program code, thereby preventing the execution of any malicious code that may be pointed to by a code pointer that has been modified or corrupted.

Code pointers can be tagged in a way that makes it difficult for an attacker to forge a valid tag. Authentication tags can be created that represent the only places in the code that can be reached through an indirect jump or branch in the logical flow of the software code. In some implementations, the tags can be cryptographic authentication tags that are encrypted using a secret key known only to processor making alternations to the tag more difficult.

The techniques disclosed herein can help prevent code pointers that have been overwritten through a memory corruption bug from inadvertently being used as a target of an indirect jump or call.

Example Hardware

Figure 1:
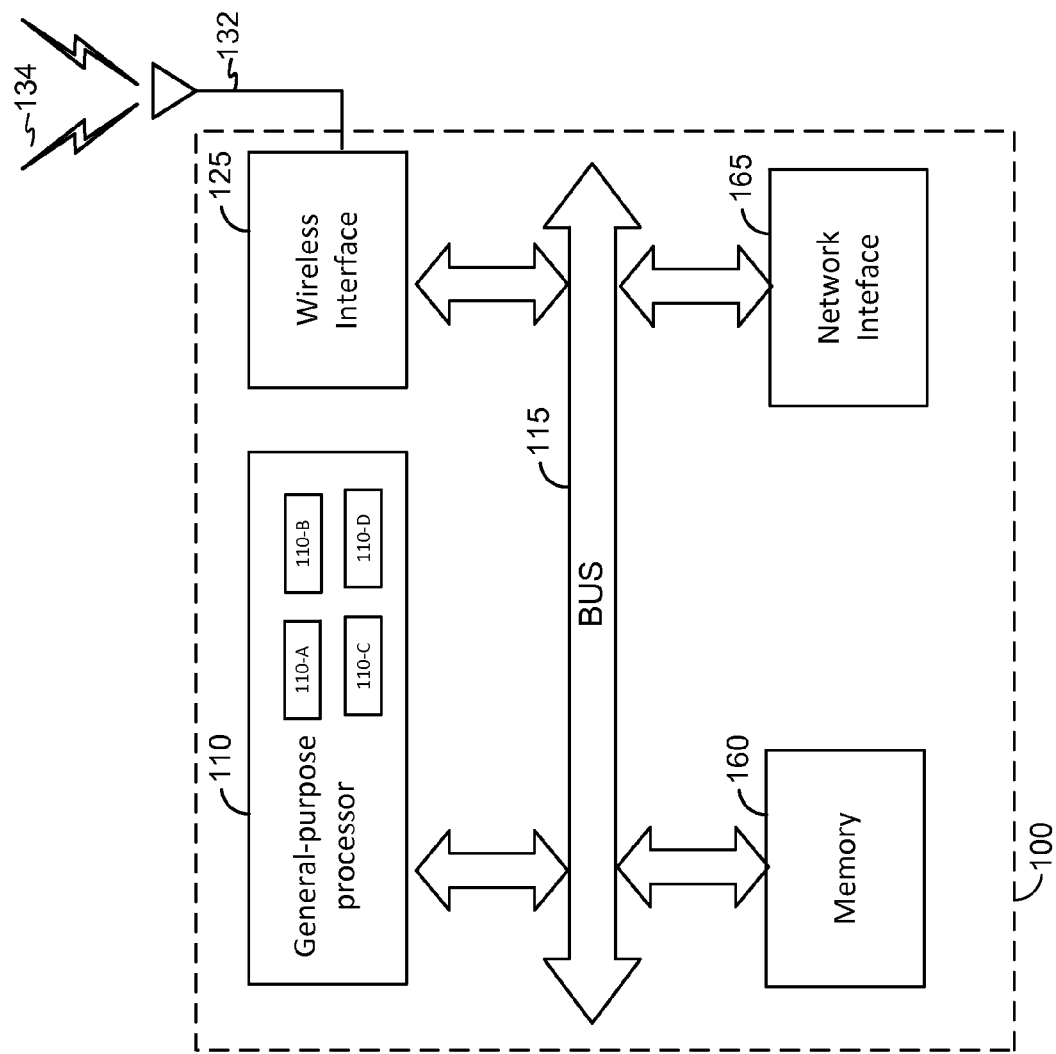
FIG. 1 is a functional block diagram of an example computer system in which the code pointer authentication techniques discussed herein can be implemented.

FIG. 1 is a block diagram of a computer system 100 that can be used to implement the various techniques disclosed herein. The computer system 100 can be used to implement, at least in part, the process illustrated in FIGS. 2-9.

The computer system 100 comprises a general-purpose processor 110, a wireless interface 125, network interface 165, and a non-transitory memory 160 connected to each other by a bus 115. The wireless interface 125 can include a wireless receiver, transmitter, transceiver, and/or other elements that enable the computer system 100 to send and/or receive data using the wireless communications protocols associated with one or more wireless wide area network (WWAN) systems, wireless local area networks (WLANs), and/or other types of wireless communication protocols that can be used to send and/or receive data. The wireless interface 125 is connected by a line 132 to an antenna 134 for sending and receiving communications to/from other wireless devices configured to communicate using wireless communication protocols. Computer system 100 may include one or more transceivers configured to receive and/or send communications using other wireless protocols in addition to or instead of the transceivers illustrated in FIG. 1.

Network interface 165 can be configured to connect the computer system 100 to one or more wired network connections. The network interface 165 can be configured to allow the computer system 100 to transmit and receive data via one or more wired data connections.

The processor 110 can be an intelligent device, e.g., a personal computer central processing unit (CPU) such as those made by Intel® Corporation or AMD®, a microcontroller, an application specific integrated circuit (ASIC), etc. The memory 160 is a non-transitory storage device that can include random access memory (RAM), read-only memory (ROM), or a combination thereof. The memory 160 can store processor-readable, processor-executable software code containing instructions for controlling the processor 110 to perform functions described herein (although the description may read that the software performs the function(s)). The software can be loaded onto the memory 160 by being downloaded via a network connection, uploaded from a disk, etc. Further, the software may not be directly executable, e.g., requiring compiling before execution.

The software in the memory 160 is configured to enable the processor 110 to perform various actions, including implementing the various techniques for protecting the code pointer authentication techniques discussed herein.

Figure 8:
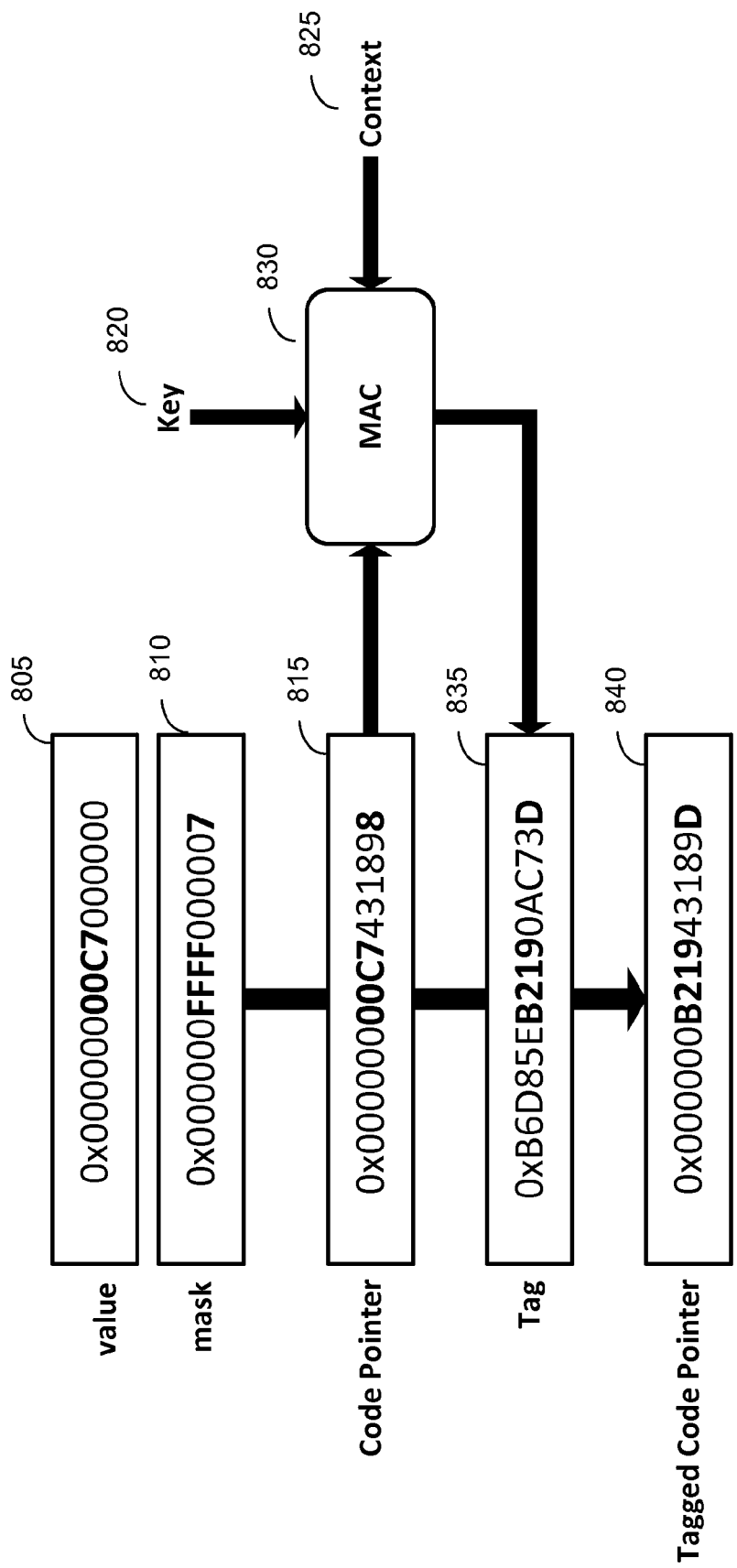
FIG. 8 is a diagram illustrating an example of the process for tagging a code pointer illustrated in FIG. 4.
Figure 9:
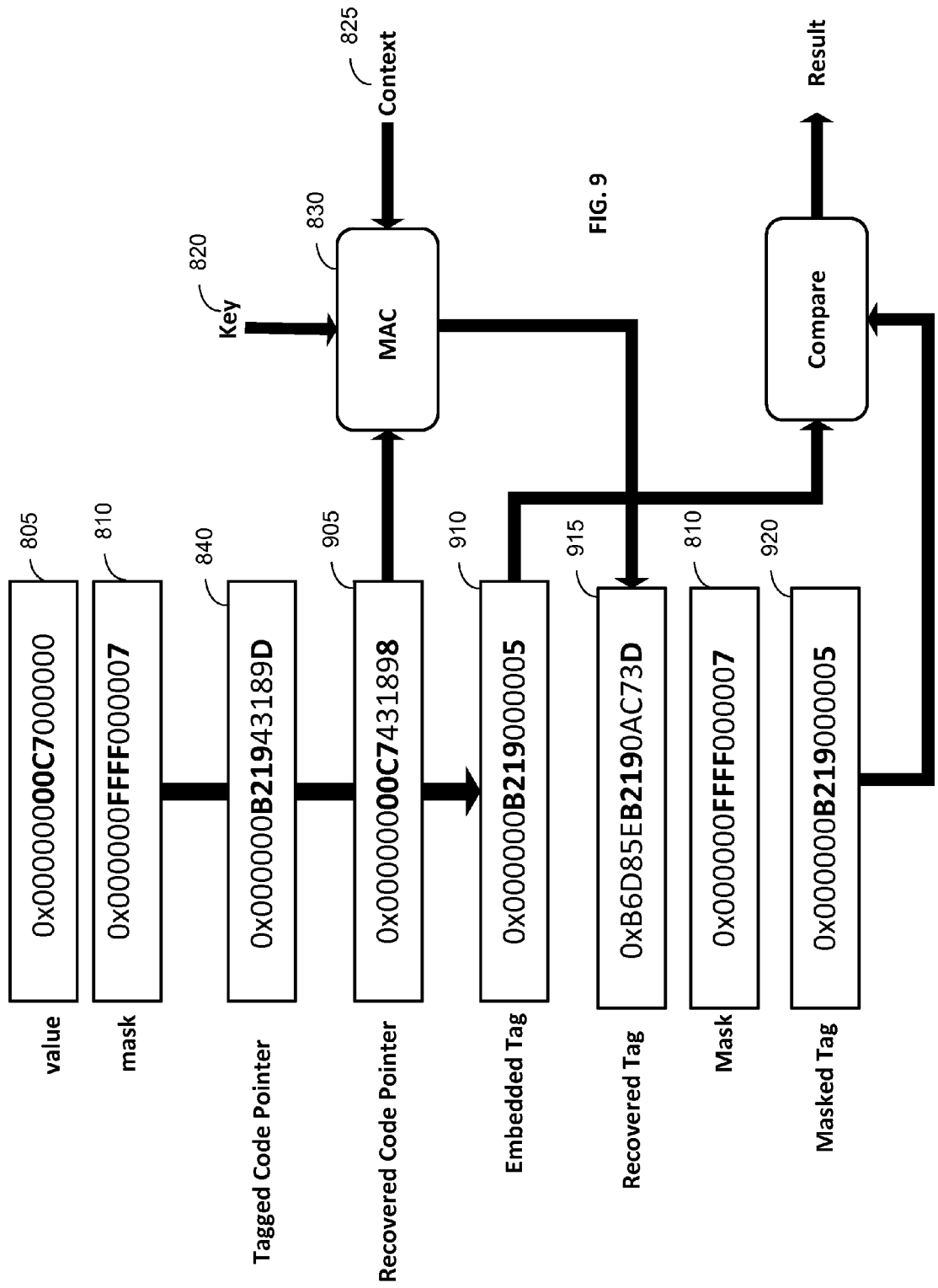
FIG. 9 is a diagram illustrating an example of the process for authenticating a tagged code pointer illustrated in FIG. 5.

The processor 110 can include one or more registers that can be used to store configuration data for the code pointer authentication techniques disclosed herein. For example, the processor 110 includes a mask register 110-A, a value register 110-B, a flags register 110-C, and a context register 110-C. The mask register 110-A can be used to store mask bits for the current mask that is used to tag code pointers and to authenticate a tagged code pointer. An example of such mask data (mask 810) is illustrated in FIGS. 8 and 9, an example process for generating such a mask is illustrated in FIG. 7. The value register 110-B can be used to store a value for the current value used when untagging a tagged code pointer to authenticate that pointer and to recover the original value of the code pointer. An example of such value data (value 805) is illustrated in FIGS. 8 and 9, an example process for generating the value data illustrated in FIG. 7. The flags register 110-C can be configured to contain flags that can be used to enable and/or disable the code pointer authentication and/or stack pointer protection techniques disclosed herein. The context register 110-C can be used to contain the current context value associated with the program code being executed by the processor 110 and that is used for generating the authentication tags associated with the code pointers for the program code. An example of such context data (context value 825) is illustrated in FIGS. 8 and 9. Other processes, such as those illustrated in FIGS. 2-6 can access and/or modify the values stored in the registers 110-A, 110-B, 110-C, and 110-D. The number of registers included in other implementations may vary.

The processor 110 can provide means for analyzing program code of the software program to identify a code pointer in the program code, means for generating an authentication tag based on the code pointer; and means for modifying the code pointer in the program code with the authentication tag to generate a tagged code pointer. The processor 110 can also provide means for generating the tagged code pointer by applying a mask to the authentication tag and the code pointer. The processor 110 can also provide means for generating the tagged code pointer by applying the mask to the authentication tag and the code pointer by providing means for selecting a first set of bits from the authentication tag using the mask and means for replacing a second set of bits of the code pointer corresponding to the first set of bits with the first set of bits to generate the tagged code pointer. The processor 110 can also provide means for identifying a plurality of code pointers in the program code and means for identifying tag bits common to the plurality of code pointers in the program code to determine the mask. The processor 110 can also provide means for authenticating the tagged code pointer, means for performing error handling responsive to the authentication tag having been altered, and means for executing a program instruction at an address associated with the code pointer responsive to the authentication tag having not been altered. The processor 110 can also provide means for determining a recovered code pointer value from the tagged code pointer using the mask.

Example Implementations

Figures 2, 3:
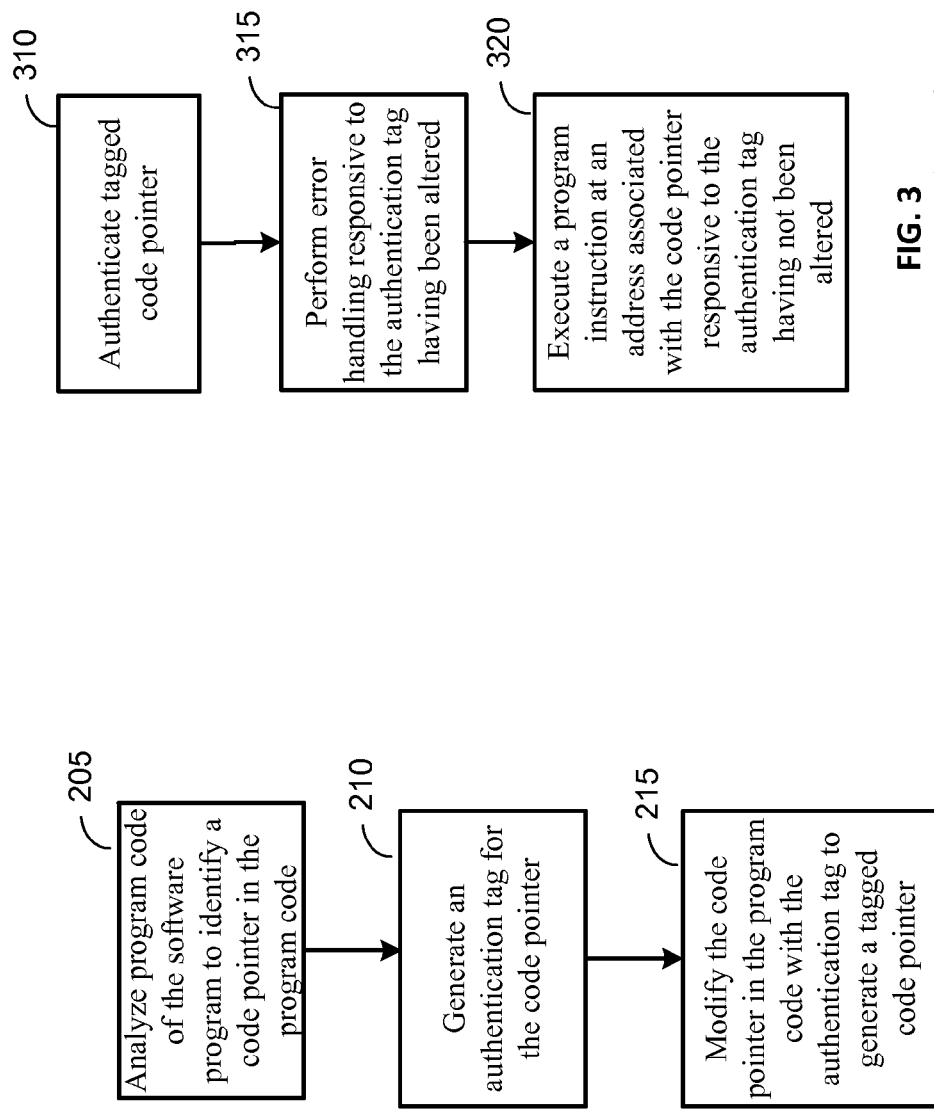
FIG. 2 is a flow diagram of an example process for code pointer authentication.
FIG. 3 is a flow diagram of an example process for authenticating a code pointer that has been protected according to the code pointer authentication process illustrated in FIG. 3.

FIG. 2 is a flow diagram of a process for enforcing flow control of a software program in a processor that can be used to implement the code pointer authentication techniques disclosed herein. The process illustrated in FIG. 2 can be implemented using the computer system 100 illustrated in FIG. 1. The example computer system 100 illustrated in FIG. 1 provides one example of one computer system in which the process illustrated in FIG. 2 may be implemented, and the process illustrated in FIG. 2 can be implemented by processors of a computer system having a different architecture than the example illustrated in FIG. 1.

Program code of a software program can be analyzed to identify a code pointer in the program code (stage 205). The program code to be analyzed can be source code or can be binary code. The code pointer can represent an address to an instruction of the program code which may be reached from a jump point or branch point the flow of the program code execution. A malicious party may attempt to obtain control of the flow of the program code by modifying the code pointer with an address associated with a different instruction than the one with which the code pointer was originally associated. The process illustrated in FIG. 1 begins with identifying a code pointer in the program code as a technique for mitigating memory corruption exploits such as those discussed above.

The example process illustrated in FIG. 1 includes identifying a code pointer in the program code for which the flow control is to be enforced. While the example illustrated in FIG. 1 discusses identifying one code pointer, the process illustrated in FIG. 1 can be adapted to identify more than one code pointer included in the program code. The processor 110 can be configured to identify the code pointer or code pointers in the program code prior to execution of the program code by the processor 110. For example, the processor 110 can be configured to identify the code pointers in the program code at the time that the program code is loaded by the processor 110 and when the dynamic or static linking is performed.

Figures 4, 5:
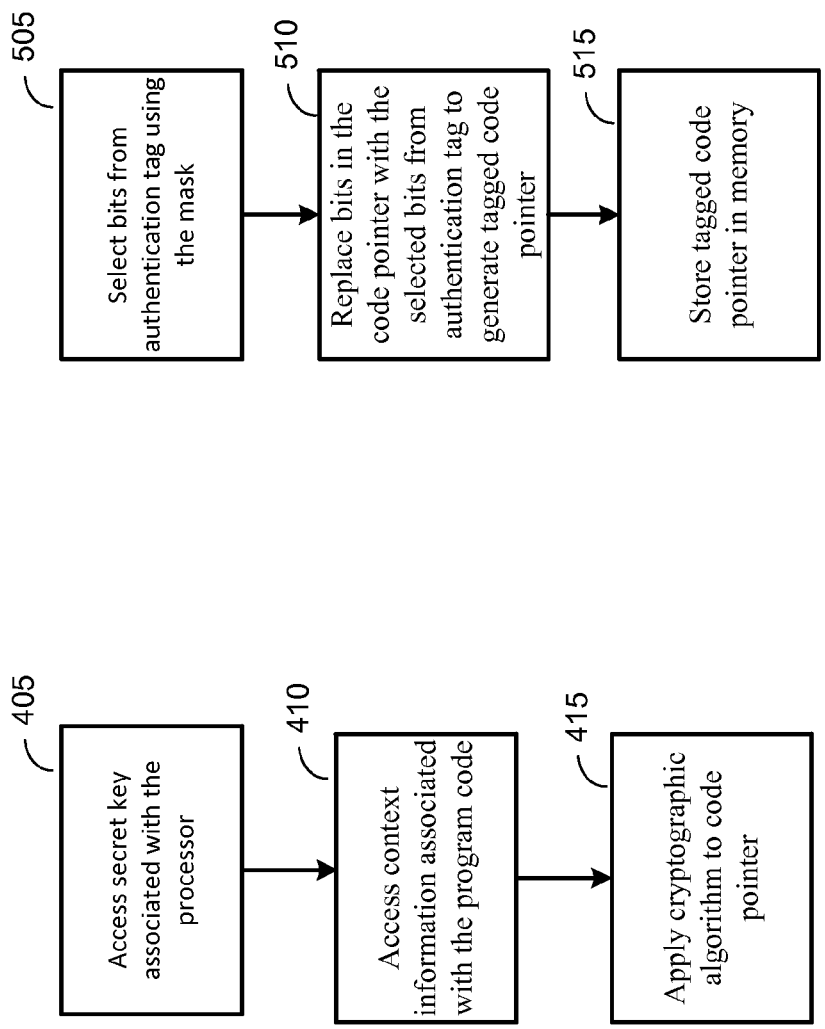
FIG. 4 is a flow diagram of an example process for generating an authentication tag.
FIG. 5 is a flow diagram of an example process for modifying a code pointer with an authentication tag to generate a tagged code pointer.

An authentication tag can be generated for the code pointer (stage 210). The authentication tag can be generated using a process that will make it difficult for a malicious party to modify a code pointer to point to a different address without being detected. In some implementations, at least a portion of the code pointer can be encrypted using a secret key that is maintained by the processor 110, and the authentication tag for the code pointer can be generated using the encrypted portion of the code pointer. Example processes for generating an authentication tag for a code pointer are illustrated in FIGS. 5 and 7.

The code pointer in the program code can be modified with the authentication tag to generate a tagged code pointer (stage 215). The code pointer may be replaced entirely or in part with the authentication tag generated in stage 210. Depending on the configuration of the computer system 100, it may not be possible to attach additional data to code pointers without making significant architectural changes to the computer system 100. Accordingly, the techniques disclosed herein modify the code pointer with the authentication tag and verify that the tagged code pointer has not been modified before executing an instruction at an address associated with the tagged code pointer. This approach doesn't require significant changes to the architecture of the computer system 100, because the tagged code pointer fits within the memory space allocated to the untagged code pointer. Furthermore, modifying the code pointer itself can make it more difficult for malicious code to redirect the program flow to a valid address. The malicious code would need to be able to generate a valid authentication tag for the desired target address and to modify a code pointer to generate a valid tagged code pointer to that address in order to redirect the flow of the program execution to that address.

FIG. 3 is a flow diagram of an example process for authenticating a code pointer that has been protected. The process illustrated in FIG. 3 can be used to authenticate a code pointer that has been modified using the process illustrated in FIG. 2. Furthermore, the process illustrated in FIG. 2 can be modified to include the stages of the process illustrated in FIG. 3. The process illustrated in FIG. 3 can be implemented using the computer system 100 illustrated in FIG. 1. The example computer system 100 illustrated in FIG. 1 provides one example of one computer system in which the process illustrated in FIG. 3 may be implemented, and the process illustrated in FIG. 3 can be implemented by processors of a computer system having a different architecture than the example illustrated in FIG. 1.

A tagged code pointer can be authenticated (stage 310). At some point during the execution of program code that includes tagged code pointers, the processor may encounter a tagged code pointer and authenticate the tagged code pointer to determine whether the tagged code pointer has been altered. For example, the tagged code pointer may have been altered by malicious or poorly written code. For example, the tagged code pointer may have been modified by malicious activity that exploits a memory corruption or memory overflow bug that allows an attacker to modify the value of a memory address associated with a code pointer. In some implementations, the processor 110 can be configured to determine that a tagged code pointer has been altered by regenerating the authentication tag associated with the code pointer and comparing the regenerated authentication tag with the authentication tag extracted from the tagged code pointer to determine whether the two tags match. If the tags match, then the tagged code pointer has not been altered, and if the tags do not match, the tagged code pointer has been altered. An example process for authenticating a tagged code pointer is illustrated in FIG. 6. The process illustrated in FIG. 6 can be used to authenticate a code pointer that has been protected using the modification technique illustrated in FIG. 3.

Returning now to FIG. 3, error handling can be performed responsive to the authentication tag having been altered (stage 315). The processor 110 can be configured to perform various types of error handling procedures that can be used to halt the execution of the program code in which the tagged code pointer has been altered. For example, the processor 110 can be configured to set a flag indicating that the tagged code pointer has been altered. The processor 110 can be configured to execute instructions in the program code that recognize that the flag has been set and are configured to respond to the error condition. For example, the program code can include instructions that terminate the execution of the program code in a controlled fashion and clean up any data associated with the program code being executed in the memory. The program code can also include instructions that warn a user of the computing device on which the program code is being executed that an error has occurred and that the program code is being shut down. Other instructions can also be included in the program code that cause the processor 110 to write information to a log providing information about the error that occurred. The program code can also include instructions that can cause the processor 110 to send the log to a remote server, such as a content provider server associated with a content provider that created or distributed the program code. The processor 110 can also be configured to perform the error handling discussed above in response to the error flag being set instead of the error handling routing being included in program code being executed by the processor 110. The processor 110 can also be configured to not recover the original code pointer from the tagged code pointer in response to determining that the tagged code pointer has been modified or altered. As a result, the tagged code pointer would not refer to a valid address and an exception can be raised. The processor 110 can be configured to handle such an exception similarly to any reference to an invalid address in program code being executed by the processor 110. For example, the processor 110 can be configured to perform standard error handling routines in response to identifying an invalid address, such as gracefully halting execution of the program code, writing error information to a log, sending the log information to a content creator or provider, notifying a user of the computing device on which the program code is being executed that the program code has to shut down due to an error, and/or other steps. These approaches to error processing can prevent the flow of the program code from being redirected by malicious code or poorly written code.

A program instruction at an address associated with the code pointer responsive to the authentication tag having not been altered can be executed (stage 320). The processor 110 can be configured to execute a program instruction at the address associated with the tagged code pointer responsive to the tagged code pointer being authenticated. If the tagged code pointer was successfully authenticated, then the code pointer is not likely to have been altered by malicious code or a memory exploit, and the flow of the program execution can continue with an instruction located at the memory address associated with the code pointer.

FIG. 4 is a flow diagram of an example process for generating an authentication tag. The process illustrated in FIG. 4 can be used to implement stage 210 of the process illustrated in FIG. 2. The process illustrated in FIG. 4 can be implemented using the computer system 100 illustrated in FIG. 1. The example computer system 100 illustrated in FIG. 1 provides one example of one computer system in which the process illustrated in FIG. 4 may be implemented, and the process illustrated in FIG. 4 can be implemented by processors of a computer system having a different architecture than the example illustrated in FIG. 1. The process illustrated in FIG. 4 will be discussed with reference to the diagram of FIG. 8, which provides an example of the process for generating an authentication tag for a code pointer and for modifying the code pointer to generate a tagged code pointer.

A secret key associated with the processor 110 can be accessed (stage 405). The secret key can be used in generating the authentication tag that can be used to modify a code pointer. The key should be kept secret and be stored in an substantially inaccessible memory location that the processor 110 can access but cannot be accessed by processes being executed by the processor 110 in order to keep the keys safe from those who wish to execute malicious code on the computer system 100. In some implementations, there may be more than one key associated with the processor 110 of the computer system 100. For example, many ARM processors and HEXAGON processors have multiple execution (privilege) levels associated with them, such as: monitor, kernel, and user modes of execution. Each of these privilege levels may contain one or more execution environments. For example, each user-mode process operates within an execution environment at the "user" privilege level, and these processes are managed by the operating system (OS) kernel. In some implementations, a guest OS may be implemented on the computer system 100. A guest OS may be operated within an execution environment at the "kernel" privilege level and be managed by a hypervisor or virtual machine monitor (VMM). In environments having multiple privilege levels, a set of protection parameters can be defined for each privilege level associated with the processor 110 of the computing system 100. These protection parameters can include keys used for tagging code pointer and for verifying tagged code pointers, a mask and value used for tagging the code pointers, processor flags to enable and/or disable code pointer verification and/or other security features such as hardware-based stack protection. Parameters associated with an execution context are hidden from other execution contexts operating at the same or a lower privilege level. The processor 110 can be configured to include registers for storing the protection parameters associated with each privilege level. The processor 110 can also be configured to expose instructions to read and set protection parameters, so that code executing at a particular privilege level can read and set the configuration registers for the next lower privilege level. In some implementations, the processor 110 is configured such that the monitor or hypervisor is permitted to manage the keys associated with its current privilege level as well as those associated with a next lowest privilege level (if any). The processor 110 can be configured such that higher privilege levels are responsible for generating and/or changing keys when creating and/or switching the processing context of the next lower privilege level. In stage 405, the key associated with the appropriate privilege level associated with the execution environment. Where multiple execution environments and/or privilege levels are not supported or where different security is not provided for each privilege level, a key associated with the processor can be accessed from a register of the processor 110.

Context information associated with the program code can be accessed (stage 410). The context information can be associated with a particular execution environment and can comprise a unique and secret value that is associated with the particular execution environment. In some implementations, context information may not be used. However, the context information provides an additional level of security. For example, if an attacker were able to read tagged code pointers from memory by exploiting an information leak vulnerability of the program code, the attacker could still potentially control the flow of the program code to call any one of the authenticated entry points associated with the tagged code pointers. The attacker would be restricted to using the addresses that were included in tagged code pointers in the exploit, but the tagged code pointers could be substituted for one another to alter the program flow. But, the addition of the context further limits the ability of an attacker by grouping code pointers by context. The context is introduced as an additional argument to the authentication function, and only pointers having the same context can be substituted for one another. Accordingly, the techniques disclosed herein that include the context can be used to enforce control flow integrity (CFI) of the program code providing that the code pointers are tagged with a proper context at load time.

The processor 110 can be configured such that execution environments operating at the same execution level cannot access the context information associated with the other execution environments operating at the same or higher level. The processor 110 can be configured such that an execution environment operating at a higher privilege level may be able to access, modify, and/or generate the context information associated with execution environments operating at a lower privilege level. In some implementations, the processor 110 can be configured such that an execution environment operating at a higher privilege level may be able to access, modify, and/or generate the context information associated with execution environments operating only one level below the current privilege level.

A cryptographic algorithm can be applied to the code pointer to generate the authentication tag (stage 415). The cryptographic algorithm can be a message authentication code (MAC). The example implementation illustrated in FIG. 8 uses a MAC algorithm 830 to generate the authentication tag 835. The inputs to the MAC algorithm 830 are the key 820 obtained in stage 405, the context information 825 obtained in stage 410, and the code pointer 815 to be tagged. The context information 825 and the code pointer 815 can be encrypted using the MAC algorithm 830 and the key 820. The context information 815 can comprise a unique value that can be used when generating the authentication tag to provide an extra layer of security. A malicious party that attempts to make unauthorized modifications to a code pointer in an attempt to take control of the flow of execution of program code would not have knowledge of the context information associated with the execution environment in which the program code is being executed and would not easily be able to replicate the authentication tag 835. For example, if the malicious party were able to exploit a memory bug that allowed access to a tagged code pointer, the tagged code pointer could only be substituted for other tagged code pointers associated with the same context.

FIG. 5 is a flow diagram of an example process for modifying a code pointer with an authentication tag to generate a tagged code pointer. The process illustrated in FIG. 5 can be used to implement stage 215 of the process illustrated in FIG. 2. The process illustrated in FIG. 5 can be implemented using the computer system 100 illustrated in FIG. 1. The example computer system 100 illustrated in FIG. 1 provides one example of one computer system in which the process illustrated in FIG. 5 may be implemented, and the process illustrated in FIG. 5 can be implemented by processors of a computer system having a different architecture than the example illustrated in FIG. 1. The process illustrated in FIG. 5 will be discussed with reference to the diagram of FIG. 8, which provides an example of the process for generating an authentication tag for a code pointer and for modifying the code pointer to generate a tagged code pointer.

Bits from the authentication tag associated with the code pointer can be selected using a mask (stage 505). In the example illustrated in FIG. 8, the mask 810 can be applied to the code pointer 815 and the authentication tag 835 to generate the tagged code pointer 840. The process illustrated in FIG. 7 illustrates one technique that can be used for generating the mask 810. Furthermore, as discussed above, the mask may be associated with a particular execution environment and/or with a particular privilege level implemented by the processor 110. In the example illustrated in FIG. 8, the mask is configured to select 19 bits: 16 upper bits and the 3 least significant bits. The mask is used to select the corresponding bits from the code pointer 815.

Bits in the code pointer can be replaced with the bits selected from the authentication tag to generate the tagged code pointer (stage 510). In the example illustrated in FIG. 8, the bits in the code pointer 815 corresponding to those selected from the authentication tag are replaced with the authentication tag bits generate the tagged code pointer 840. For example, the value of the tagged code pointer 840 can be derived using the following expression:

$$(\text{pointer} \ \& \ \sim\text{mask}) | (\text{tag} \ \& \ \text{mask})$$

where the "pointer" value represents the value of the code pointer 815, the "~mask" value represents the inverse value of the mask 810, the "tag" value represents the authentication tag 835, and the "~mask" value represents the value of the mask 810.

The tagged code pointer can be stored in the memory location associated with the code pointer (stage 515). The tagged code pointer 840 can be written to the location in memory 160 or the other memory location in which the code pointer 815 was originally stored. The processor 110 can be configured to decode and to authenticate the tagged code pointer 840 before executing an instruction at an address associated with the tagged code pointer 840. A malicious party attempting to modify the tagged code pointer 840 would not be able to generate a valid value for the code pointer without knowing the algorithm used to generate the authentication tag 835, the mask value 810 (also referred to herein as mask 810) used to select which bits of the code pointer 815 should be replaced with bits from the authentication tag 835, and/or the context information 825 and key 820 used to generate the authentication tag 835.

Alternatively, the process illustrated in FIG. 5 for generating a the tagged code pointer can be a modified such that the bits from the authentication tag 835 can be selected as discussed above in stage 505, but stage 510 can be modified such that bits from the code pointer are selected from the code pointer using the inverse value of the mask 810. The bits selected from the authentication tag 835 and the bits selected from the code pointer 815 can then be combined to create the tagged code pointer 840.

FIG. 6 is a flow diagram of an example process for authenticating a tagged code pointer that has been protected according to the code pointer authentication process illustrated in FIG. 4. The process illustrated in FIG. 6 can be used to implement stage 310 of the process illustrated in FIG. 3. The process illustrated in FIG. 6 can be implemented using the computer system 100 illustrated in FIG. 1. The example computer system 100 illustrated in FIG. 1 provides one example of one computer system in which the process illustrated in FIG. 6 may be implemented, and the process illustrated in FIG. 6 can be implemented by processors of a computer system having a different architecture than the example illustrated in FIG. 1. The process illustrated in FIG. 6 will be discussed with reference to the diagram of FIGS. 8 and 9, which provide an example of the process for recovering an authentication tag from a tagged code pointer and for determining whether the tagged code pointer has been altered.

A recovered code pointer value from the tagged code pointer can be determined using the mask (stage 605). The recovered code pointer 905 can be determined from the tagged code pointer 840 using the mask 810 that was used in stage 505 of the process illustrated in FIG. 5 to generate the authentication tag 835 that was used to modify the code pointer and create the tagged code pointer 840. As discussed above, the mask may be associated with the processor 110, and the processor 110 may have access to different masks for different execution environments and/or privilege levels. The processor 110 can be configured to select the appropriate mask 810 for the execution environment and/or privilege level associated with the program code being executed if multiple execution environments and/or privilege levels have been implemented by the processor 110. The mask is used to select the bits from the tagged code pointer 840 that were replaced with the bits from the authentication tag 835. The selected bits of the tagged code pointer 840 are replaced by value 805, which is the original value for these bits, to produce the recovered code pointer 905. A process for determining the value 805 and for generating the mask bits is illustrated in FIG. 7, and will be discussed in detail below.

As an example, the value of the recovered code pointer 905 can be derived using the following expression:

$$(\text{value} \ \& \ \text{mask}) | (\text{tagged code pointer} \ \& \ \sim\text{mask})$$

where the "value" represents the common set of bits represented by the value 805, the "mask" value represents the value of the mask 810, the "tagged code pointer" value represents the tagged code pointer 840, and the "~mask" value represents the inverse value of the mask 810.

A recovered authentication tag can be generated based at least in part on the recovered code pointer, the context value, and a key (stage 610). In the example illustrated in FIG. 9, the recovered authentication tag 915 is generated by applying the MAC algorithm 830 to the recovered code pointer 905. The MAC algorithm 830 receives the key 820, the recovered code pointer 905, and the context value 825 as inputs. The process for generating the recovered authentication tag 915 is similar to that illustrated in FIGS. 4 and 8 where the tagged code pointer 840 was generated. The recovered code pointer 905 in addition to the key 820 and the context information 825, which were originally used to generate the tagged code pointer 840, are provided as inputs to the MAC logic 830. The MAC logic 830 outputs the recovered authentication tag 915.

An embedded authentication tag value can be extracted from the tagged code pointer using the mask (stage 615). The embedded authentication tag 910 can be extracted from the code pointer using the mask 810 that was used to extract the recovered code pointer 905 from the tagged code pointer 840.

As an example, the value of the embedded authentication tag 910 can be derived using the following expression:

$$\text{recovered code pointer \& mask}$$

where the "recovered code pointer" represents the value of the recovered code pointer 905, and the "mask" value represents the value of the mask 810.

A masked tag value can be extracted from the recovered authentication tag 915 (stage 620). As can be seen in the example of FIGS. 8 and 9, the set of bits selected from the recovered code pointer 905 to create the embedded authentication tag 910 does not include all of the bits originally included the authentication tag 835. However, the recovered authentication tag 915 can be compared to the embedded authentication tag 910 after applying the mask 810 to the recovered authentication tag 915. The mask 810 can be applied to the recovered authentication tag 915 to generate masked tag 920. This process is similar to the process discussed above for determining the embedded authentication tag 910 from the tagged code pointer 840.

As an example, the value of the masked tag 920 can be derived using the following expression:

$$\text{recovered tag \& mask}$$

where the "recovered tag" represents the value of the recovered code pointer 905, and the "mask" value represents the value of the mask 810.

Comparing the recovered authentication tag to the embedded authentication tag (stage 625). Stage 625 is also represented by block 925 of FIG. 9. The masked tag 920 can then be compared to the embedded authentication tag 910 to generate the result 930. If the masked tag 920 matches the embedded authentication tag 910, then the tagged code pointer 840 has been successfully authenticated, and the result 930 can include an indication that the authentication was successful. The value of the tagged code pointer 840 is not likely to have been altered since the tagged code pointer 840 was generated and placed in memory. If the masked tag 920 does not match the embedded authentication tag 910, then the tagged code pointer 840 has not been successfully authenticated, and the result 930 can include an indication that the authentication was unsuccessful. The value of the tagged code pointer 840 has been altered or corrupted since the tagged code pointer 840 has been generated and stored in memory. The processor 110 can be configured to execute error handling procedures in the event that authentication fails to prevent malicious program code from assuming control of flow of the program code being executed by the processor 110.

FIG. 7 is a flow diagram of an example process for generating a mask that can be used with the code pointer authentication techniques discussed herein. The process illustrated in FIG. 7 can be implemented using the computer system 100 illustrated in FIG. 1. The example computer system 100 illustrated in FIG. 1 provides one example of one computer system in which the process illustrated in FIG. 6 may be implemented, and the process illustrated in FIG. 7 can be implemented by processors of a computer system having a different architecture than the example illustrated in FIG. 1. The process illustrated in FIG. 7 can be performed prior to the executing the processes illustrated in FIGS. 2-6, 8, and 9. For example, the process illustrated in FIG. 7 may be executed at the time that the processor 110 is performing static or dynamic linking of the program code. The processor 110 can also be configured to perform the process illustrated in FIG. 7 at other times prior to performing the processes illustrated in FIGS. 2-6, 8, and 9.

A plurality of code pointers identified in the program code can be compared (stage 705). The processor 110 can be configured to compare a plurality of code pointers in the program code to determine a common set of bits in the addresses associated with the code pointers. The bits that are common for the code pointers in a set of program code can be replaced with an authentication tag value without compromising the code pointers and without requiring additional memory space for storing the authentication tags. This approach can help to minimize the number of changes that may need to be made to the architecture of the processor 110 to support the code pointer authentication techniques disclosed herein.

A common set of bits in the addresses associated with the code pointers can be identified (stage 710). The common set of bits can be used as the basis for the value 805 which is illustrated in the examples illustrated in FIGS. 8 and 9 and used in the process illustrated in FIG. 6 for authenticating a tagged code pointer 840. In the example illustrated in FIGS. 8 and 9, the code pointers had in common 16 upper bits and 3 least significant bits. The processor 110 can be configured to store the value 805 derived from the common set of bits in the addresses associated with the code pointer in a register or other memory accessible to the processor 110 that can be later accessed when the processor 110 needs to authenticate a code pointer associated with the program code. The processor 110 can be configured to place the value 805 in a register or other memory location that is inaccessible from program code being executed in other execution contexts and/or by program code being executed at the same and/or a lower privilege level.

The address space that is available to program code can be limited, and the amount of memory that is addressable by code pointers is typically much larger than the amount of memory that is addressable by the code pointers. In some systems, such some 64-bit systems, the range of possible addressable that may be represented by a code pointer is further restricted. The processor 110 can also be configured such that the static and dynamic linkers are configured to align program code segments in memory such that code is packed together at runtime. This can result in the code pointers having more bits in common, thereby increasing the number of bits that can be used to store the authentication tag information in tagged code pointers.

A mask can be generated based on the common bits identified in the addresses associated with the code pointers (stage 715). For example, the mask 810 in the examples illustrated in FIGS. 8 and 9 was generated based on the value 805 derived from comparing the code pointers in the program code to identify common bits from the code pointer. The comparison step is not illustrated in FIGS. 8 and 9 and would have been performed prior to the tagging and authentication processes illustrated in these figures. The bits in the mask 810 can be set to binary value of 1 where the corresponding bits in each of the code pointers shared the same value and the bits in the mask 810 can be set to a binary value of 0 where the corresponding bits in each of the code pointers did not all share the same value. The processor 110 can be configured to store the mask 810 in a register or other memory location that is inaccessible from program code being executed in other execution contexts and/or by program code being executed at the same and/or a lower privilege level.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for enforcing flow control of a software program in a processor, the method comprising:
    analyzing program code of the software program to identify a plurality of code pointers in the program code;
    identifying a common set of bit values in an address of each of the plurality of code pointers; and
    for each code pointer of the plurality of code pointers:
        generating an authentication tag based on the code pointer; and
        modifying the code pointer in the program code with the authentication tag to generate a tagged code pointer by replacing a set of bits in the code pointer with a set of bits from the authentication tag, the set of bits being replaced in the code pointer corresponding to the common set of bit values.

2. The method of claim 1, wherein modifying the code pointer in the program code with the authentication tag to generate the tagged code pointer further comprises:
    generating the tagged code pointer by applying a mask to the authentication tag and the code pointer.

3. The method of claim 2, wherein generating the tagged code pointer by applying the mask to the authentication tag and the code pointer further comprises:
    selecting a first set of bits from the authentication tag using the mask; and
    replacing a second set of bits of the code pointer corresponding to the first set of bits with the first set of bits to generate the tagged code pointer.

4. The method of claim 2, further comprising:
    determining the mask based on the common set of bits.

5. The method of claim 1, further comprising:
    authenticating the tagged code pointer associated with one of the plurality of code pointers;
    performing error handling responsive to the authentication tag having been altered; and
    executing a program instruction at the address associated with the code pointer responsive to the authentication tag having not been altered.

6. The method of claim 5, wherein authenticating the tagged code pointer comprises:
    determining a recovered code pointer value from the tagged code pointer using a mask.

7. The method of claim 6, further comprising:
    extracting an embedded authentication tag value from the tagged code pointer using the mask.

8. The method of claim 7, further comprising:
    generating a recovered authentication tag based at least in part on the recovered code pointer value and a context value.

9. The method of claim 8, further comprising:
    extracting a masked tag value from the recovered authentication tag using the mask.

10. The method of claim 9, further comprising:
    comparing the masked tag value to the embedded authentication tag value to determine whether the tagged code pointer has been altered.

11. An apparatus for enforcing flow control of a software program in a processor, the apparatus comprising:
    means for analyzing program code of the software program to identify a plurality of code pointers in the program code;
    means for identifying a common set of bit values in an address of each of the plurality of code pointers; and
    for each code pointer of the plurality of code pointers:
        means for generating an authentication tag based on the code pointer; and
        means for modifying the code pointer in the program code with the authentication tag to generate a tagged code pointer comprising means for replacing a set of bits in the code pointer with a set of bits from the authentication tag, the set of bits being replaced in the code pointer corresponding to the common set of bit values.

12. The apparatus of claim 11, wherein the means for modifying the code pointer in the program code with the authentication tag to generate the tagged code pointer further comprises:
    means for generating the tagged code pointer by applying a mask to the authentication tag and the code pointer.

13. The apparatus of claim 12, wherein the means for generating the tagged code pointer by applying the mask to the authentication tag and the code pointer further comprises:
    means for selecting a first set of bits from the authentication tag using the mask; and
    means for replacing a second set of bits of the code pointer corresponding to the first set of bits with the first set of bits to generate the tagged code pointer.

14. The apparatus of claim 12, further comprising:
    means for determining the mask based on the common set of bits.

15. The apparatus of claim 11, further comprising:
    means for authenticating the tagged code pointer associated with one of the plurality of code pointers;
    means for performing error handling responsive to the authentication tag having been altered; and
    means for executing a program instruction at the address associated with the code pointer responsive to the authentication tag having not been altered.

16. The apparatus of claim 15, wherein authenticating the tagged code pointer comprises:
    means for determining a recovered code pointer value from the tagged code pointer using a mask.

17. An apparatus for enforcing flow control of a software program in a processor, the apparatus comprising:
    a processor configured to:
        analyze program code of the software program to identify a plurality of code pointers in the program code;
        identify a common set of bit values in an address of each of the plurality of code pointers; and
        for each code pointer of the plurality of code pointers:
            generate an authentication tag based on the code pointer; and
            modify the code pointer in the program code with the authentication tag to generate a tagged code pointer by replacing a set of bits in the code pointer with a set of bits from the authentication tag, the set of bits being replaced in the code pointer corresponding to the common set of bit values.

18. The apparatus of claim 17, wherein the processor being configured to modify the code pointer in the program code with the authentication tag to generate the tagged code pointer is further configured to:
    generate the tagged code pointer by applying a mask to the authentication tag and the code pointer.

19. The apparatus of claim 18, wherein the processor being configured to generate the tagged code pointer by applying the mask to the authentication tag and the code pointer is further configured to:
    select a first set of bits from the authentication tag using the mask; and
    replace a second set of bits of the code pointer corresponding to the first set of bits with the first set of bits to generate the tagged code pointer.

20. The apparatus of claim 18, wherein the processor is further configured to:
    determine the mask based on the common set of bits.

21. The apparatus of claim 17, wherein the processor is further configured to:
    authenticate the tagged code pointer associated with one of the plurality of code pointers;
    perform error handling responsive to the authentication tag having been altered; and
    execute a program instruction at the address associated with the code pointer responsive to the authentication tag having not been altered.

22. The apparatus of claim 21, wherein the processor being configured to authenticate the tagged code pointer is further configured to:
    determine a recovered code pointer value from the tagged code pointer using a mask.

23. The apparatus of claim 22, wherein the processor is further configured to:
    extract an embedded authentication tag value from the tagged code pointer using the mask.

24. A non-transitory computer-readable medium, having stored thereon computer-readable instructions for enforcing flow control of a software program in a processor, comprising instructions configured to cause a computer to:
    analyze program code of the software program to identify a plurality of code pointers in the program code;
    identify a common set of bit values in an address of each of the plurality of code pointers; and
    for each code pointer of the plurality of code pointers:
        generate an authentication tag based on the code pointer; and
        modify the code pointer in the program code with the authentication tag to generate a tagged code pointer by replacing a set of bits in the code pointer with a set of bits from the authentication tag, the set of bits being replaced in the code pointer corresponding to the common set of bit values.

25. The non-transitory computer-readable medium of claim 24, wherein the instructions configured to cause the computer to modify the code pointer in the program code with the authentication tag to generate the tagged code pointer is further comprise instructions configured to cause the computer to:
    generate the tagged code pointer by applying a mask to the authentication tag and the code pointer.

26. The non-transitory computer-readable medium of claim 25, wherein the instructions configured to cause the computer to generate the tagged code pointer by applying the mask to the authentication tag and the code pointer further comprise instructions configured to cause the computer to:
    select a first set of bits from the authentication tag using the mask; and
    replace a second set of bits of the code pointer corresponding to the first set of bits with the first set of bits to generate the tagged code pointer.

27. The non-transitory computer-readable medium of claim 25, further comprising instructions configured to cause the computer to:
    determine the mask based on the common set of bits.

28. The non-transitory computer-readable medium of claim 24, further comprising instructions configured to cause the computer to:
    authenticate the tagged code pointer associated with one of the plurality of code pointers;
    perform error handling responsive to the authentication tag having been altered; and execute a program instruction at the address associated with the code pointer responsive to the authentication tag having not been altered.

29. The non-transitory computer-readable medium of claim 28, wherein the instructions configured to cause the computer to authenticate the tagged code pointer further comprise instructions configured to cause the computer to:
   determine a recovered code pointer value from the tagged code pointer using a mask.

30. The non-transitory computer-readable medium of claim 29, further comprising instructions configured to cause the computer to:
   extract an embedded authentication tag value from the tagged code pointer using the mask.

* * * * *